United States Patent [19]

Brown

[11] Patent Number: 4,651,332

[45] Date of Patent: Mar. 17, 1987

[54] SECTOR SCAN COMPUTER

[75] Inventor: Bruce J. Brown, Alexandria, Va.

[73] Assignee: The United States of America as represented by the Secretary of the Navy, Washington, D.C.

[21] Appl. No.: 260,028

[22] Filed: Jun. 2, 1972

[51] Int. Cl.⁴ .................... G01D 21/02; H03K 5/22; G01S 7/44

[52] U.S. Cl. ................... 377/20; 328/111; 328/129.1; 342/13

[58] Field of Search ............. 343/5 DP, 18 E, 17.1 R; 325/322, 323, 324, 325; 328/108, 109, 110, 111, 129.1; 307/234; 377/20

[56] References Cited

U.S. PATENT DOCUMENTS

| | | | |
|---|---|---|---|
| 3,155,912 | 11/1964 | Applebaum et al. | 325/108 |
| 3,391,403 | 7/1968 | Phillips | 343/5 DP |
| 3,514,707 | 5/1970 | Campanard et al. | 343/17.1 R |
| 3,603,886 | 9/1971 | Norrs | 325/324 |

Primary Examiner—T. H. Tubbesing
Assistant Examiner—John B. Sotomayor
Attorney, Agent, or Firm—Sol Sheinbein; Philip Schneider

[57] ABSTRACT

A sector-scan period computer comprising a pulse-width discriminator and a pulse-interval filter to allow only pulses falling into a predetermined width range and with a given time interval between them to pass. These pulses are fed to an integrator which provides an integrated signal for each group (burst) of pulses, the bursts being periodic. The integrated signals are divided by two and a pulse is produced for each signal that remains. Extraneous non-periodic signals are filtered out by a period filter and the time between successive pulses is counted by a BCD counter. The counter output is stored in a memory and displayed by a decimal number display.

5 Claims, 4 Drawing Figures

SECTOR SCAN COMPUTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to apparatus for computing the period of the transmission from a radar set, especially that of a radar which periodically transmits a burst of pulses.

One of the important missiles developed by a foreign power employs an active homing radar system using a sector-scan antenna. The radar emits a burst of pulses each time the antenna passes the 5° left-of-center position. The period between bursts may vary for different missiles, though generally remaining in the approximate range of 2.0 to 3.5 seconds. For counterintelligence purposes, it is necessary to determine the period of the sector scan, which is equivalent to the interval between the beginning of odd-numbered (or even-numbered) bursts.

Previously, determination of the period was accomplished by displaying the received radar signal on a PPI scope, noting the occurrence of the range mark bursts on the display and using a counter to determine the time interval between every other burst. The present invention automatically determines the sector-scan period.

BRIEF SUMMARY OF THE INVENTION

The objects and advantages of the invention are accomplished by sending the received signal through a pulse width discriminator to eliminate pulses wider or narrower than a predetermined range; feeding the width-limited pulses through a pulse interval filter which passes only individual pulses separated by the correct time interval; feeding the resulting signal to a pulse-train detector which provides a single integrated signal for the group of pulses constituting a single burst; eliminating alternate integrated signals; eliminating extraneous aperiodic bursts; and measuring the time interval between the periodic integrated signals which corresponds to alternate bursts of the originally received signal.

OBJECTS

An object of this invention is to determine the time period of a sector-scan radar.

Another object is to measure the time interval between alternate bursts of pulses periodically transmitted by a radar set.

Other objects, advantages and novel features of the invention will become apparent from the following detailed description of the invention when considered in conjunction with the accompanying drawings wherein:

DETAILED DESCRIPTION

Figure 1:
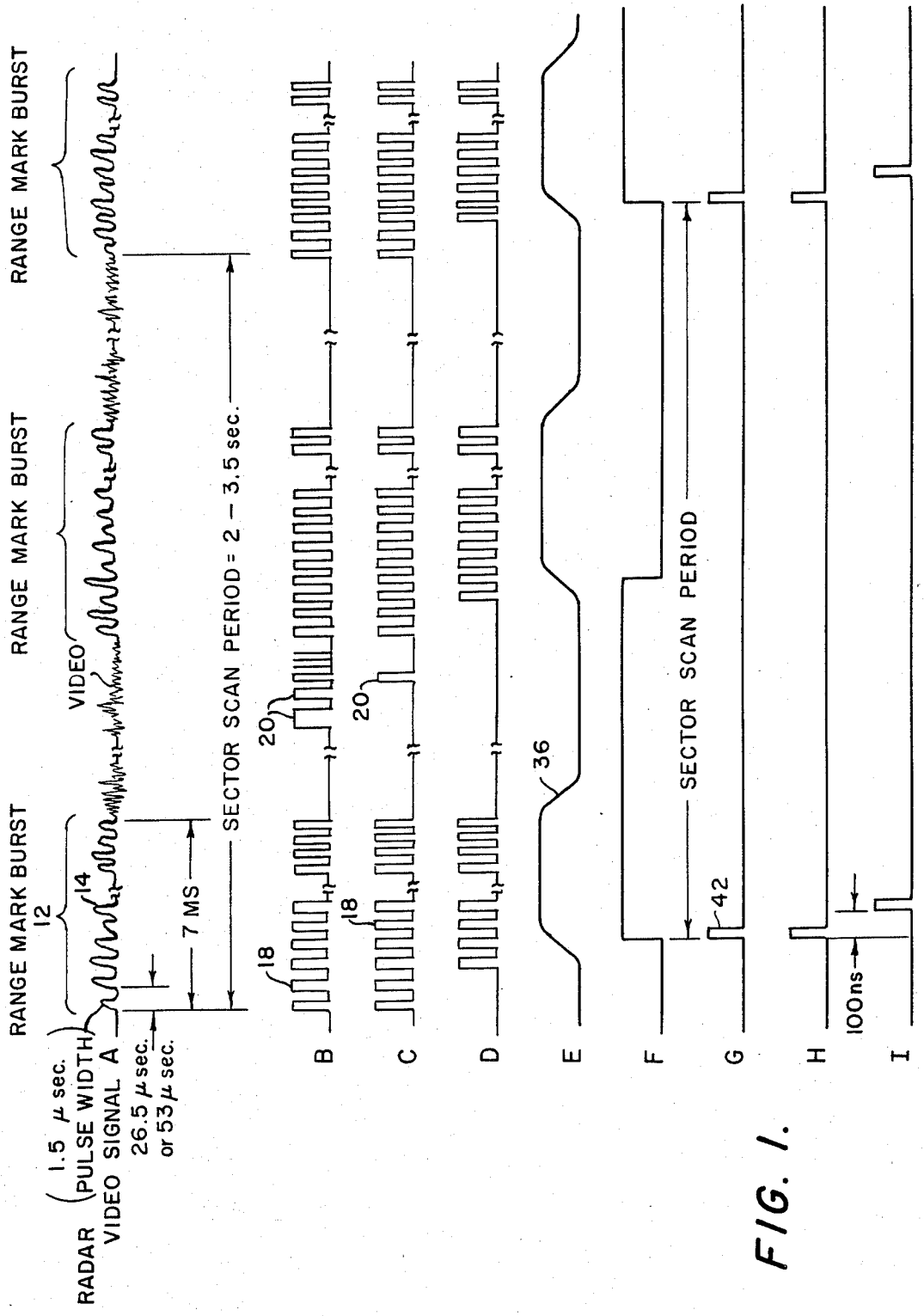
FIG. 1 is a schematic illustration of the waveforms of signals existing at different points of the embodiment of the invention shown in FIG. 2.

The signals emitted by the missile in interest comprise an r.f. seeker signal and a radar video signal which enables the operator at the launching platform to "see" what the missile "sees" on the PPI or B-scope indicator. The radar video signal Ⓐ (see FIG. 1) contains the seeker's own retransmitted video signal summed with 4 (or 8) kilometer range mark bursts. Each burst 12 contains a number of 1.5 μsec pulses 14 which have a period of 26.5 μsecs (or 53 μsecs), the entire burst having a duration of 7 milliseconds. The bursts occur each time the missile antenna looks in a direction 5° left of center. By determining the period between alternate bursts, the sector-scan period of the missile's seeker radar is determined. The burst signals are shown in waveform Ⓐ of FIG. 1.

Figure 2:
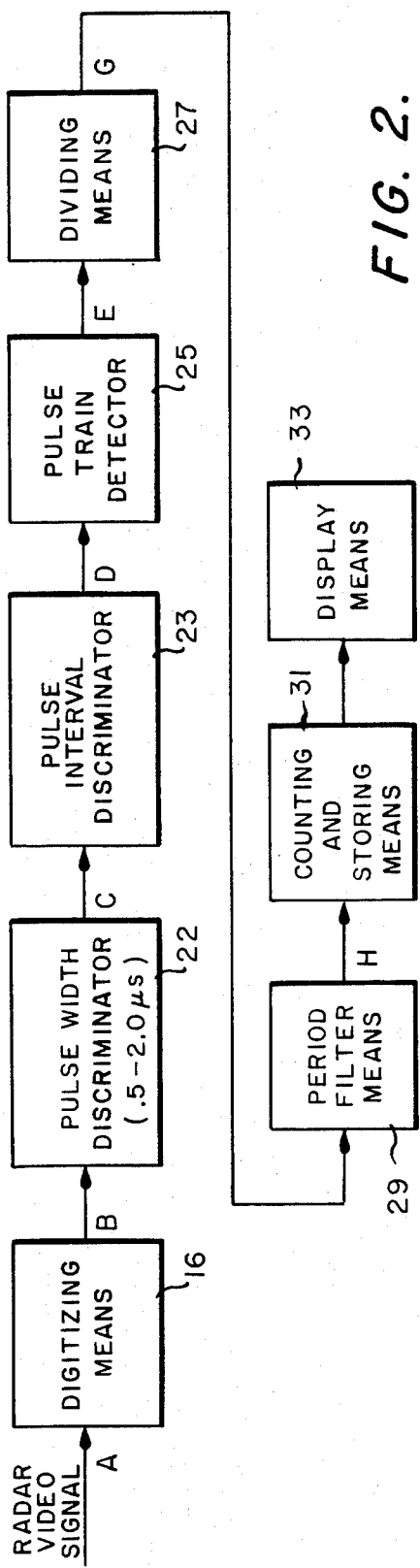
FIG. 2 is a block diagram of an embodiment of the invention.

FIG. 2 shows the invention in block form. The radar video signal is received and fed to a digitizing means 16, or analog-to-digital converter, for converting the 1.5 μs pulses 14 in each burst into uniformly shaped rectangular pulses 18 (waveform B, FIG. 1). Note that this signal would also contain other video pulses 20 of equal height but of different durations or widths. This signal is passed through a pulse-width discriminator 22 which passes only pulses whose widths lie in the range of 0.5 to 2.0 μs. Thus, most of the digitized video pulses are eliminated while the burst pulses 14 are passed, the output waveform of the discriminator being waveform C of FIG. 1.

Waveform C is now fed into a pulse-interval discriminating means 23 consisting of (see FIG. 3) a first 53 μs delay means 24, a first AND gate 26, a second 53 μs delay means 28, and a second AND gate 30, in series. The pulse-interval discriminating means 23 produces a pulse each time three consecutive pulses occur at 53 μs intervals. The output signal is shown in waveform D, FIG. 1.

The output of the pulse-interval discriminator 23 is then fed to a pulse-train detector 25 consisting of a pulse stretcher 32 (one-shot multivibrator) and an integrator 34 having a 3 millisecond time constant. The pulse stretcher is used because it is difficult to integrate the narrow pulses of waveform D. The integrator 34 produces a single signal 36 for each burst as shown in waveform E.

The integrated signal, E, is then passed through a dividing means 27 comprising a divide-by-two circuit 38 and a pulse circuit 40. The circuit 38 is a flip-flop which divides its input by two. The output of the dividing circuit 38 waveform F, is a rectangular wave with a period equal to the sector-scan period. Waveform F is fed to the pulse circuit 40, comprising a one-shot multivibrator, which is triggered by the start of each rectangular portion of waveform F to provide a short pulse 42.

Waveform G, the output of the pulse circuit 40 of the dividing means, is coupled into a period filter 29 which is a means for filtering out any extraneous bursts which do not occur at periodic intervals, as is characteristic of the desired range mark bursts. When large video signals are present, it is conceivable that video segments may pass through the pulse-width discriminator 22 in the same manner as do the range mark pulses. This "false alarming" results in the generation of undesirable pulses which ultimately produce period computation errors.

To eliminate these extraneous pulses, some means must be available to detect and pass only pulses of a periodic pulse train (specifically, the string of alternating range-mark burst signals (waveform G)). Therefore, all pulses not in phase with a periodic pulse train must be suppressed.

Figure 4:
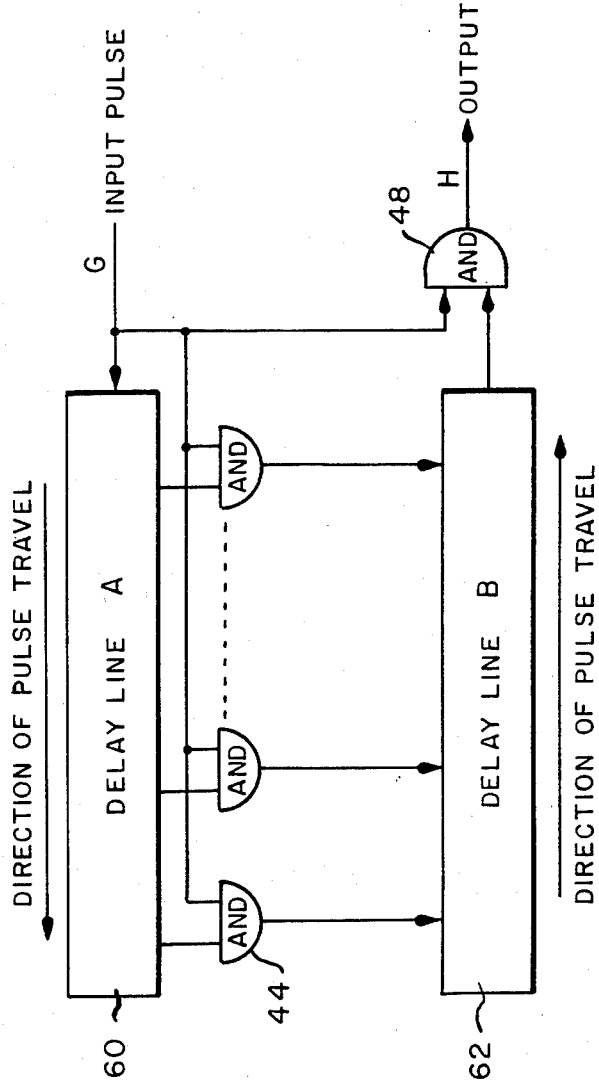
FIG. 4 is a block diagram of a more general form of the period filter than is shown in FIG. 3.

The periodic filter, as can be seen in FIG. 4 has one input and one output port. An output is generated whenever any three pulses are coupled in so that the period between the first and second pulses equals the period between the second and third pulses. It is not necessary that these pulses be consecutive. Two delay lines 60 and 62 are employed whose lengths should be greater than any expected interval between the desired periodic pulses (in this case, it should be greater than the sector-scan period which may be in the approximate range of 2.0 to 3.5 seconds). Each of the parallel outputs from delay line A are individually "ANDED" with the input line pulses. The outputs from the AND gates 44 are fed into parallel-input delay line B having the opposite direction of pulse travel. In this arrangement, any pulse which is transferred through one of the AND gates 44 is necessarily equidistant between the input to delay line A and the output of delay line B. The output of delay line B is now "anded" with the input to the period filter. Thus, the only time input pulses reach the output of the period filter 29 is when the pulses occur so that the middle pulse is equidistant in time from a preceding and a subsequent pulse, i.e., when the input pulses are periodic.

Figure 3:
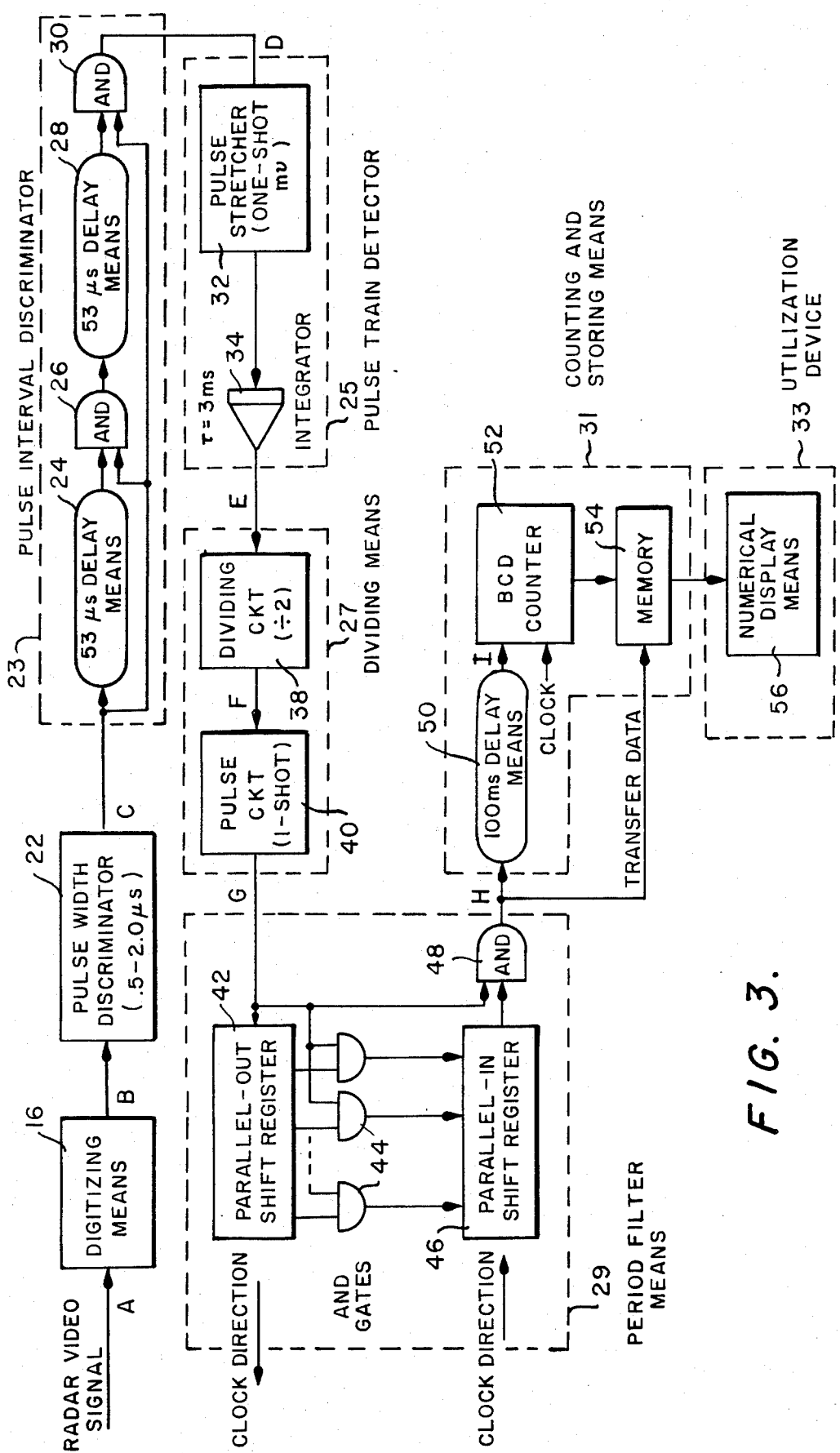
FIG. 3 is a block diagram of the invention in somewhat greater detail than FIG. 2.

FIG. 3 shows shift registers 42 and 46 being employed as delay lines. The diagram does not show the clocking means for delivering the usual clocking pulses to the registers but a clocking means is employed. The delay period of the registers are equal to the clock period times the number of bits in each register.

The output (waveform H) of the period filter 29 is fed to the counting and storing means 31 comprising a delay means 50 having a very short delay of 100 nanoseconds, a BCD (binary) counter 52 and a memory 54. (Actually, for determining the sector-scan period alone, only the counter 52 is necessary. The output H is fed to the memory slightly before (100 nanoseconds) the BCD counter 52 is activated by the same pulse. Thus, the memory is ready to store the count (corresponding to the time between the setting of the counter by one pulse and the resetting of the counter by the succeeding pulse) which is the sector-scan period less the insignificant amount of the 100-nanosecond delay.

The time count stored in the memory can then be employed in some way such as be being displayed on a numerical display means 56, for example.

Obviously, many modifications and variations of the present invention are possible in light of the above teachings. It is therefore to be understood that within the scope of the appended claims the invention may be practiced otherwise than as specifically describe.

What is claimed and desired to be secured by Letters Patent of the United States is:

1. A pulse period computer for determining the time interval between alternate bursts of pulses of predetermined pulse width and predetermined period, sait bursts also occurring periodically, comprising in combination:
   digitizing means for digitizing an incoming pulsed signal;
   pulse-width discrlminating means for receiving the digitized signal and passing only those pulses within a given pulse-width range which includes said predetermined pulse width;
   pulse-interval discriminating means for receiving said pulse-width-discriminated signal and passing only those pulses which occur at intervals corresponding to said predetermined period;
   pulse-train detection means for receiving the output of said pulse-interval discriminating means and integrating the bursts of pulses to provide an output having a long integrated pulse for each burst of pulses;
   dividing means for receiving the output of said pulse-train detection means and passing only alternate ones of said integrated pulses;
   period-filter means for receiving the output of said dividing means and passing only periodic pulses therefrom; and
   counting means connected to receive the output of said period-filter means for measuring the time interval between said pulses.

2. A computer as in claim 1, further including means for storing the output of said counting means.

3. A computer as in claim 1, said dividing means comprising a divide-by-two circuit for producing a short pulse for each long integrated pulse in said output.

4. A computer as in claim 2, further including utilization means for utilizing the stored output of said connecting means.

5. A computer as in claim 4, wherein said utilization means comprises visual display means.

* * * * *